United States Patent [19]

Richardson

[11] 4,344,323

[45] Aug. 17, 1982

[54] DYNAMIC TIMING ADJUSTMENT TOOL

[75] Inventor: Ronald D. Richardson, Pekin, Ill.

[73] Assignee: Caterpillar Tractor Co., Peoria, Ill.

[21] Appl. No.: 122,230

[22] Filed: Feb. 19, 1980

[51] Int. Cl.$^3$ .......... G01M 15/00

[52] U.S. Cl. .......... 73/119 A; 123/343

[58] Field of Search .......... 73/119 A, 116; 74/401, 74/395, 674, 679; 81/3 R; 123/343

[56] References Cited

U.S. PATENT DOCUMENTS 3,385,125 5/1968 Plumb .......... 74/395

3,946,590 3/1976 Bechstein et al. .......... 73/119 A X

*Primary Examiner*—Jerry W. Myracle

*Attorney, Agent, or Firm*—Wegner, McCord, Wood and Dalton

[57] ABSTRACT

A tool (40) for selectively adjusting the relative angular positions of a fuel pump camshaft (14) and an engine main shaft to minimize the effects of gear lash and thereby optimize fuel pump timing, including a hollow first shaft (50) which is adapted to rotate with a driven gear (36) rotatably received on a tapered sleeve (26) fixed to the camshaft (14), and a second shaft (66) coaxial with and reciprocably and rotatably received within the first shaft (50) and adapted to be coupled to the camshaft (14) for rotation therewith. The second shaft (66) is coupled through a planetary gear arrangement (90–94, 97–104) to the first shaft for rotation of the main shaft. Structure is provided for adjusting the relative angular positions of the first and second shafts (50,66) and for axially translating the first shaft (50) to lock the driven camshaft gear (36) on the tapered sleeve (26).

5 Claims, 2 Drawing Figures

DYNAMIC TIMING ADJUSTMENT TOOL

TECHNICAL FIELD

This invention relates to gear timing adjustment tools and, more specifically, to a tool for adjusting the relative angular positions of an engine fuel pump camshaft and main shaft during operation of the engine to minimize the effects of gear lash in order to optimize fuel pump timing.

DISCLOSURE OF THE INVENTION

In one aspect of the present invention, a tool is provided for selectively adjusting the relative angular positions of an engine fuel pump camshaft and the engine's main shaft during engine operation to minimize the effect of gear lash between the two shafts. In the preferred apparatus, a first hollow shaft is adapted to engage a camshaft drive gear for rotation therewith, and a second shaft is reciprocably and rotatably received within the first shaft and is adapted to be coupled to the camshaft for rotation therewith. The camshaft drive gear rotates relative to a sleeve intermediate the camshaft and a central aperture of the gear.

The first and second shafts are coupled to each other by a planetary gear structure for rotational driving of the inner shaft at the same rate as the outer shaft.

Means are provided for adjusting the relative angular positions of the first and second shafts and to axially urge the second shaft and its retained drive gear into locking engagement with the camshaft sleeve to retain the drive gear in the desired position.

Efficient fuel combustion is enhanced to a significant degree of minimization of effects of gear lash in the gear train between the engine's main shaft and a camshaft, such as a fuel pump camshaft, in an engine. Due to the use of a plurality of serially connected gears in the train, even relatively small degrees of lash between adjacent gears results in a significant degree of lash over the entire train.

Minimization of undesirable effects of gear lash may be accomplished, to some degree, by static angular adjustment of the camshaft relative to the main shaft. However, the best static timing methods result in a minimum of $\pm 1.0°$ of gear play over the entire typical gear train, since static adjustment cannot correct for hydraulic and other effects evident only during operation of the engine.

With the timing adjustment tool of the present invention, however, gear play due to lash may be reduced to about $\pm 0.1°$ by angular adjustment of the camshaft relative to the main shaft during engine operation.

BEST MODE FOR CARRYING OUT THE INVENTION

Figure 1:
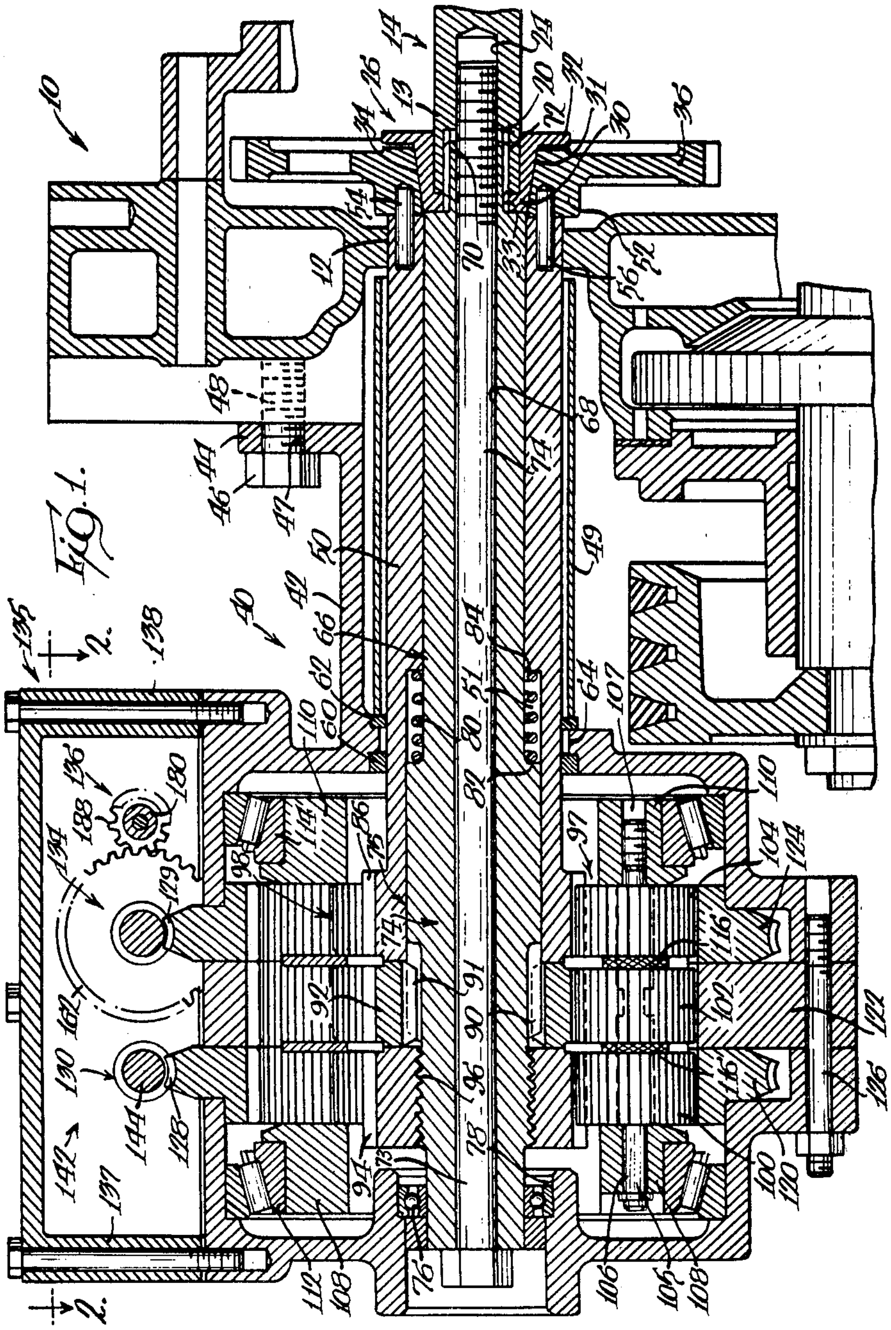
FIG. 1 is a sectional view of an embodiment of the present invention shown in place upon a fuel pump camshaft of an internal combustion engine.

Referring to FIG. 1, a portion of an engine housing, generally designated 10, is illustrated. The housing 10 has a bore 12 aligned with an end 13 of a conventional fuel pump camshaft 14. The camshaft end 13 has a spined axial bore 20 and a threaded bore 24 of reduced diameter coaxial with the bore 20 and extending inwardly therefrom.

A tapered sleeve 26 is secured by any suitable means to the camshaft end 13 and has a radially inwardly extending annular lip 30 for receipt of the camshaft end 13 and a frustoconical surface 31 which tapers outwardly from the lip 30 to a radially outwardly extending peripheral flange 32. The lip 30 has a splined central aperture 33 aligned with the splined bore 20.

A frusto-conical central aperture 34 of a radial drive gear 36 loosely receives the sleeve surface 31 for rotation and limited axial translation thereon. The gear 36 is rotated by engagement with a gear train (not shown) driven by the engine's main shaft (not shown).

A dynamic timing adjustment tool, generally designated 40, is illustrated in place on the engine housing 10 and in engagement with the camshaft 14 and the gear 36. The tool 40 has a housing 42 with a radially extending foot 44 mounted to the crankcase 10 by a mounting bolt 46 extending through a bolt hole 47 in the foot 44 and threadedly received by a bore 48 in the housing 10. A tube 49 of a diameter substantially identical to that of the bore 12 extends axially from the housing 42 and terminates adjacent to and coaxially with the bore 12.

Mounted for rotation and limited axial movement within the housing 42 and extending from the tube 49 is a first shaft 50 having an axial throughbore 51. The shaft 50 extends from the tube 49 and through the bore 12 into abutment with the hub 52 of the gear 36. The outer diameter of the shaft 50 closely approximates the diameter of the bore 12, but is free to rotate therein. Dowel pins 54 and 56 extend axially from the shaft 50 and are received by the gear hub 52 and maintain the relative angular positions of the shaft 50 and the gear 36. Two axially spaced annular seals 60 and 62 are disposed between the shaft 50 and a bore 64 in the housing 42.

A hollow inner shaft, generally designated 66, having an axial throughbore 68 is reciprocably and rotatably received within the bore 51 and abuts the lip 30. A reduced diameter projection 70 extends from the shaft 66 through the lip aperture 33 and into the bore 20 and is coupled to each for rotation by splines 72. A mounting bolt 73 extends through the bore 68 and is threadedly received in the camshaft bore 24 to secure the shaft 66 and the sleeve 26 against the camshaft end 43 for rotation therewith.

An end 74 of the shaft 66 projects from the bore 51 at an end 75 of the shaft 50 farthest from the camshaft 14 and extends through an annular bearing 76 and an opening 78 in the housing 42 for rotation therein. An axial helical spring 80 is retained between radial abutment surfaces 82 and 84 of the shafts 66 and 50, respectively, to urge the shaft 50 toward the camshaft 14.

The shaft 50 mounts a sun gear 86 at the shaft end 75. A sun gear 90 is splined at 91 to the shaft 66 and to a sun gear 92 adjustment and coaxial with the gear 86 for rotation of the gear 90 with the shaft 66 and limited axial movement of the gear 90 on the shaft 66. A fourth sun gear 94 is threaded on a section 96 of the shaft 66 and is adjacent and coaxial with the sun gear 92.

Three sets 97, 98 and 99 of coaxial planet gears 100, 102, and 104 (not all of which are shown) are spaced a 120° intervals about the common outer diameter of the sun gears 90–94. Each planet gear 100–104 engages a respective sun gear 94, 92, and 86. Each of the gears 100–104 is journalled to a spider shaft 105.

Each spider shaft 105 is supported at its ends 106 and 107 by one of two axially spaced annular carriers 108 and 110, respectively, which in turn are rotatably supported within the housing 42 by a respective annular bearing 112 or 114. Thrust bearings 116 separate the gears 100–104 from each other to allow independent rotation thereof.

Three ring gears 120, 122 and 124, each coaxial with the axis defined by the bolt 74, are mounted adjacent each other within the housing 40 for engagement with the planet gears 100, 102 and 104, respectively. The central ring gear 122 is fixed to the housing 40 as by a mounting bolt 126 extending therethrough, while the ring gears 120 and 124 are rotatably adjustable within the housing 40 and have external teeth 128 and 129, respectively, engaged by transversely extending worm gears 130 and 134 mounted in a housing extension 135.

Figure 2:
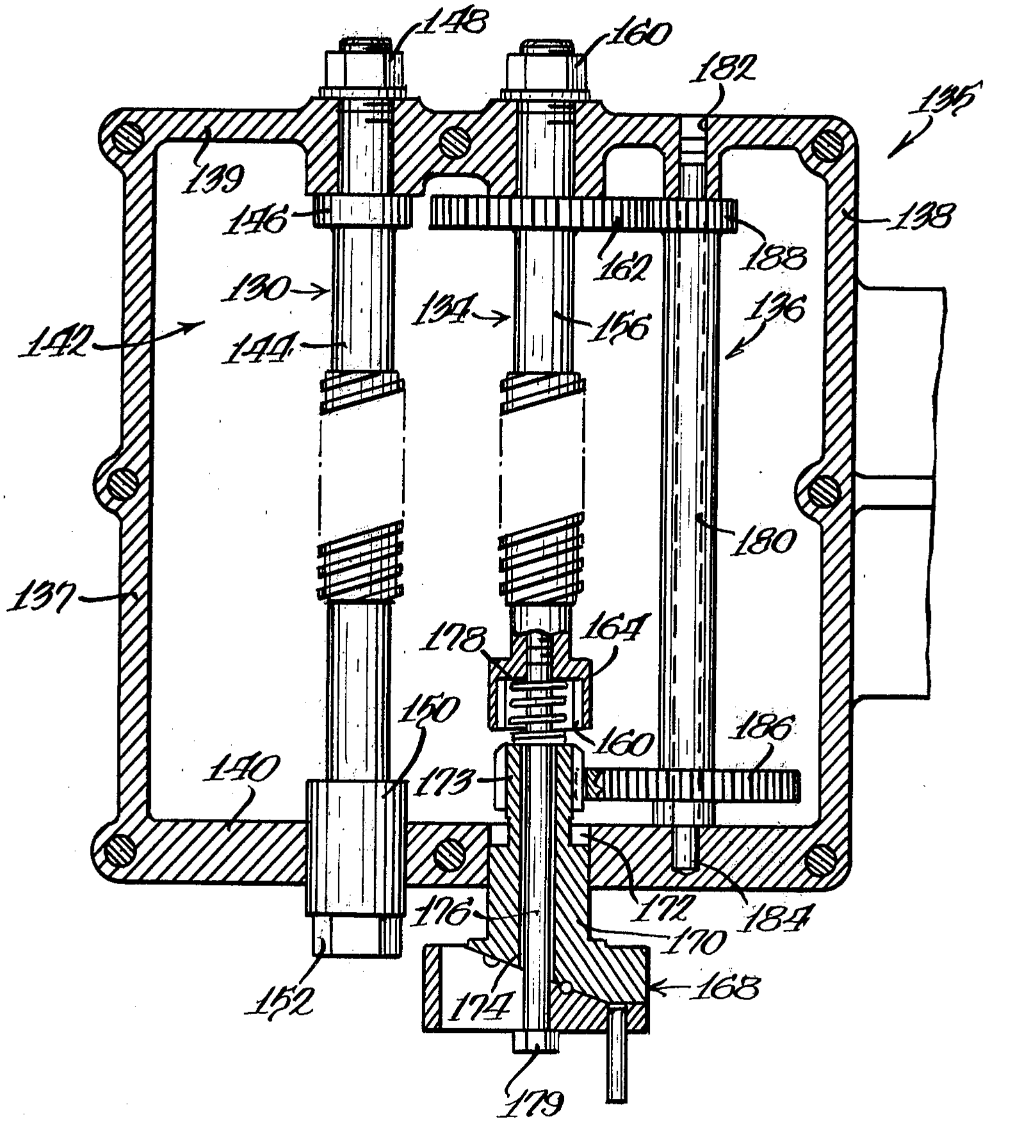
FIG. 2 is a sectional view, taken approximately along line 2—2 of FIG. 1.

Referring now to FIG. 2, the worm gears 130 and 134 and an associated gear reduction mechanism 136 are journalled within the housing extension 135 comprising spaced pairs of upstanding walls 137–138 and 139–140. A shaft 144 of the gear 130 extends transversely of a chamber 142 defined by the walls 137–140 and is rotatably retained in the walls 139 and 140 as by a flange 146 spaced from a mounting nut 148 about the wall 139, and by a cylindrical portion of enlarged diameter 150 extending through the wall 140. The shaft 144 terminates in a hex head 152 by which the gear 130 ultimately may be rotated.

The worm gear 134 includes a shaft 156 rotatably retained in the wall 139 by a mounting nut 160 and an enlarged gear 162 spaced therefrom. The opposite end of the shaft 156 terminates in an enlarged diameter cup-shaped coupling 164 having an internal ring gear 166.

A rotatable handle 168 has a cylindrical body 170 rotatably retained in a bore 172 in the wall 140 and terminates in gear 173. The body 170 has an axial throughbore 174 and a mounting bolt 176 of reduced diameter extends therethrough and is threadedly received in the shaft 156. An axial spring 178 extends between the base of the coupling 164 and the gear 173 to urge the handle 168 against the head 179 of the mounting bolt 176.

The gear reduction assembly 136 has a shaft 180 rotatably mounted in opposed bores 182 and 184 in the walls 139 and 140, respectively, and has large and small gears 186 and 188 engaging the splines 173 and the gear 162, respectively. The gear 173 selectively engages the gear 186 or the interior gear 166 of the coupling 164 by axial positioning of the handle 168 on its mounting bolt 176. Engagement of the gear 173 with the gear 186 allows the worm gear 134 to be rotated by a small ratio relative to the handle 168, while direct coupling of the gear 173 with the gear 166 allows rotation of the worm gear 134 on a one-to-one basis relative to the handle 68.

Industrial Applicability

The tool is assembled to the engine in the manner previously described with the drive gear 34 loose on the sleeve 26. Operation of the engine results in driven rotation of the drive gear 36 and the shaft 50.

Rotation of the shaft 50 and the sun gear 86 carried thereby drives each planet gear 104 about its associated spider shaft 105 and, therefore, rotatably drives the carriers 108 and 110 and the spider shafts 105 about the housing 42 since the ring gear 124 is held stationary by the worm gear 134. Rotation of the spider shafts 105 and carriers 108 and 110 results in rotation of the planet gears 100 and 102 within their associated ring gears, which are stationary, and about their associated sun gears.

Rotation of the planet gears 100 and 102 and the sun gear 92 drives the sun gear 90 and the shaft 66 which in turn rotatably drives the tapered sleeve 26 and the camshaft 14 coupled thereto at a rate equal to the rate of rotation of the gear 36.

Angular adjustment of the ring gear 124 by rotation of the worm gear assembly 134 advances or retards the rate of rotation of each set of planet gears 100–104 and their associated carriers 105 relative to the shaft 50 and consequently advances or retards the rate of rotation of the shaft 66 relative to the shaft 50 to change the relative angular positions of the camshaft 14 relative to the gear 36. It will be appreciated that such relative angular adjustment of the camshaft 14 relative to the gear 36 effects a timing adjustment between the gears of the engine gear train. With the aid of external timing indication devices, the angular relationship of the power train gears to the camshaft 14 may be adjusted to minimize the gear play attributable to gear lash.

With reference to FIG. 2, such adjustment may be facilitated by the selective use of the gear reduction mechanism 136. Rough adjustments may be made by direct rotation of the worm gear 134 by coupling of the gear 173 and the coupling 164, and fine adjustments may be made by engagement of the gear 173 with the gear 186.

After adjustment of the angular relationship of the camshaft 14 relative to the main shaft, it is necessary to secure the gear 36 to the camshaft 14 for rotation therewith. This is accomplished by rotation of the ring gear 120 by the worm gear assembly 130.

Rotation of the ring gear 120 results in advancement or retardation of the rate or rotation of the sun gear 94 relative to the shaft 66, resulting in translation of the sun gear 94 on the threaded section 96 to abut the sun gear 92 to urge the gear 92 against the shaft 50, resulting in translation thereof toward the camshaft 14. The urging of the shaft 50 lightly wedges the gear 36 on the tapered sleeve 26.

With the gear 36 frictionally locked on the tapered sleeve 26, the engine may be stopped and the mounting bolts 74 and 48 removed from the camshaft 14 and the housing 10, respectively, whereupon a locking bolt mechanism may be inserted in the bore 24 to retain the sleeve 26 and the gear 36 in position.

Other aspects, objects and advantages of this invention can be obtained from a study of the drawings and the appended claims.

What is claimed is:

1. A tool (40) for adjusting the relative angular positions of a camshaft (14) and a mainshaft, said camshaft (14) having a radial gear (36) engaging and driven by said mainshaft, said camshaft gear (36) being rotatably received and axially adjustable on a tapered sleeve (26) carried on said camshaft (14) intermediate said camshaft (14) and said camshaft gear (36), said tool (40) comprising:

- a first hollow shaft (50) adapted to abut and to be coupled to said camshaft gear (36) for rotation therewith;
- a second shaft (66) reciprocably and rotatably received within said first shaft (50), said second shaft (66) being adapted to abut said tapered sleeve (26) and to be coupled to said camshaft (14) for rotation therewith, said first and second shafts (50,66) having means (92–94, 97–104) coupling said second shaft (66) to said first shaft (50) for rotatable driving of said second shaft (66) at the same rate of rotation as said first shaft (50) in response to said rotation of said first shaft (50);

means (90, 92, 102, 104, 124, 134) for intermittently adjusting the rate of rotation of said second shaft (66) relative to that of said first shaft (50) to adjust the relative angular positions of said first and second shafts (50, 66); and means (94, 100, 120, 130) for adjusting the axial position of said first shaft (50) relative to that of said second shaft (66) to urge said camshaft gear (36) into locking engagement of said tapered sleeve (26).

2. The tool (40) of claim 1 wherein said coupling means (92–94, 97–104) comprises first and second adjacent sun gears (86, 92) on said first and second shafts (50, 66), respectively, first and second coaxial planet gears (104, 102) adjacent to each other and carried for rotation on a spider shaft (105), said first and second sun gears (86,92), respectively, and first and second ring gears (124, 122) engaging said first and second planet gears (104, 102), respectively, for rotation of said first and second planet gears (104, 102) and spider shaft (105) thereabout.

3. The tool (40) of claim 2 wherein said shaft rotation adjustment means comprises said coupling means whereby said first ring gear (124) is angularly adjustable relative to said second ring gear (122) to advance or retard the rate of rotation of said spider shaft (105) and said first and second planet gears (104, 102) carried thereon to correspondingly advance or retard the rate of rotation of said first and second sun gears (86, 92) associated therewith whereby the rate of rotation of said second shaft (66) relative to said first shaft (50) is advanced or retarded.

4. The tool (40) of claim 3 wherein said shaft axial adjustment means comprises a third sun gear (94) threadedly received on said second shaft (66) adjacent to and abutting said second sun gear (92), a third planet gear (100) carried on said spider shaft (105) and engaging said third sun gear (94), and a third ring gear (120) engaging said third planet gear (100) and being selectively rotatable relative to said first and third ring gears (124, 122) to rotate said third sun gear (94) to axially urge said third sun gear (94) against said second sun gear (92) whereby said first shaft (50) is axially translated relative to said second shaft (66).

5. A tool (40) for adjusting the relative angular positions of a camshaft (14) and a mainshaft, said camshaft (14) having a radial gear (36) engaging and driven by said mainshaft, said camshaft gear (36) being rotatably received on a tapered sleeve (26) carried on said camshaft (14) intermediate said camshaft (14) and said camshaft gear (36), said tool (40) comprising:

a first hollow shaft (50) adapted to abut and to be coupled to said camshaft gear (36) for rotation therewith;

a second shaft (66) reciprocably and rotatably received within said first shaft (50), said second shaft (66) being adapted to abut said tapered sleeve (26) and to be coupled to said camshaft (14) for rotation therewith, said first and second shafts (50, 66) having means (92–94, 97–104) coupling said second shaft (66) to said first shaft (50) for rotatable driving of said second shaft (66) at the same rate of rotation as said first shaft (50) in response to said rotation of said first shaft (50); and means (90, 92, 102, 104, 124, 134) for intermittently adjusting the rate of rotation of said second shaft (66) relative to that of said first shaft (50) to adjust the relative angular positions of said first and second shafts (50,66).

* * * * *